US009569563B2

(12) United States Patent
Estor et al.

(10) Patent No.: US 9,569,563 B2
(45) Date of Patent: Feb. 14, 2017

(54) METHOD FOR PREDICTION AND CONTROL OF HARMONIC COMPONENTS OF TIRE UNIFORMITY PARAMETERS

(75) Inventors: Patrice R. Estor, Greer, SC (US); Julien Matthieu Flament, Clermont-Ferrand (FR); Verner Steve Nicholson, Pelzer, SC (US); Anton Felipe Thomas, Greer, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 913 days.

(21) Appl. No.: 13/704,425

(22) PCT Filed: Jun. 14, 2010

(86) PCT No.: PCT/US2010/038493
§ 371 (c)(1),
(2), (4) Date: Dec. 14, 2012

(87) PCT Pub. No.: WO2011/159272
PCT Pub. Date: Dec. 22, 2011

(65) Prior Publication Data
US 2013/0090879 A1 Apr. 11, 2013

(51) Int. Cl.
*G06F 17/40* (2006.01)
*G01M 17/02* (2006.01)
(52) U.S. Cl.
CPC .............. *G06F 17/40* (2013.01); *G01M 17/02* (2013.01)

(58) Field of Classification Search
CPC ...... G01M 17/022; G01M 17/02; G01N 21/95
See application file for complete search history.

(56) References Cited

U.S. PATENT DOCUMENTS 3,841,033 A 10/1974 Appleby et al.
4,155,789 A 5/1979 Wireman et al.
(Continued)

FOREIGN PATENT DOCUMENTS

EP 0 565 320 10/1993
EP 0580024 1/1994
(Continued)

OTHER PUBLICATIONS

International Search Report for Application No. PCT/US2010/038493, dated Aug. 10, 2010.
(Continued)

*Primary Examiner* — Mischita Henson
(74) *Attorney, Agent, or Firm* — Dority & Manning, P.A.

(57) ABSTRACT

Improved and more easily implemented methods for predicting high speed radial force variation and uneven mass distribution utilize other measurements such as radial run out and other parameters. The prediction model for high speed radial force variation uses a speed-dependent calibration term for predicting higher harmonic components, while the same or other models can be used for the first harmonic. The uneven mass distribution prediction model accounts for deformation of the tire along multiple tracks, thus employing a more realistic model of crown deformation that accounts for changing tire stiffness levels across different harmonic components of the measured and predicted parameters.

17 Claims, 7 Drawing Sheets

(56) References Cited

U.S. PATENT DOCUMENTS

| | | |
|---|---|---|
| 4,327,580 A | 5/1982 | Suzuki et al. |
| 5,238,041 A | 8/1993 | Tomita et al. |
| 5,396,438 A | 3/1995 | Oblizajek |
| 5,559,437 A | 9/1996 | Baccaud et al. |
| 6,086,452 A | 7/2000 | Lipczynski et al. |
| 6,347,547 B1 | 2/2002 | Moriguchi et al. |
| 6,386,945 B1 | 5/2002 | Fahringer et al. |
| 6,539,789 B1 | 4/2003 | Kostka et al. |
| 6,615,144 B2 | 9/2003 | Williams et al. |
| 6,820,074 B1 | 11/2004 | Simpson |
| 6,868,358 B2 | 3/2005 | Brown, Jr. |
| 7,012,609 B2 | 3/2006 | Rose et al. |
| 7,082,816 B2 | 8/2006 | Zhu |
| 7,580,812 B2 | 8/2009 | Ariyur et al. |
| 8,113,049 B2 | 2/2012 | Corghi |
| 8,200,461 B2 | 6/2012 | Fang |
| 8,287,675 B2 | 10/2012 | Mawby et al. |
| 2002/0177959 A1 | 11/2002 | Williams et al. |
| 2003/0149542 A1 | 8/2003 | Chang |
| 2004/0017289 A1 | 1/2004 | Brown, Jr. |
| 2004/0020583 A1 | 2/2004 | Zhu et al. |
| 2005/0259859 A1 | 11/2005 | Hassler et al. |
| 2005/0262933 A1* | 12/2005 | Zhu .................. G01M 17/022 73/146 |
| 2006/0123898 A9 | 6/2006 | Zhu |
| 2006/0137802 A1 | 6/2006 | Flament et al. |
| 2006/0138705 A1 | 6/2006 | Korba et al. |
| 2007/0000594 A1 | 1/2007 | Mawby et al. |
| 2008/0103659 A1 | 5/2008 | Mancosu et al. |
| 2009/0279757 A1 | 11/2009 | Drabycz et al. |
| 2010/0005883 A1 | 1/2010 | Corghi |
| 2010/0180676 A1 | 7/2010 | Braghiroli et al. |
| 2011/0118989 A1 | 5/2011 | Morinaga |
| 2012/0035757 A1 | 2/2012 | Mawby et al. |
| 2012/0095587 A1 | 4/2012 | Hair et al. |

FOREIGN PATENT DOCUMENTS

| | | |
|---|---|---|
| FR | 2433178 | 3/1980 |
| GB | 2 351 346 | 12/2000 |
| JP | 5278283 | 7/1977 |
| JP | S58-200140 | 11/1983 |
| JP | S62-232507 | 10/1987 |
| JP | H02-042306 | 2/1990 |
| JP | H05-215530 | 8/1993 |
| JP | H07253448 | 10/1995 |
| JP | H10-160452 | 6/1998 |
| JP | H10-160453 | 6/1998 |
| JP | S63-191947 | 8/1998 |
| JP | H1154735 | 2/1999 |
| JP | 2001-141615 A1 | 5/2001 |
| JP | 2002-116012 | 4/2002 |
| JP | 2004-156919 | 5/2002 |
| JP | 3507945 | 3/2004 |
| JP | 2002-350126 | 12/2004 |
| JP | 2004-361344 | 12/2004 |
| JP | 2005-069693 | 3/2005 |
| JP | 2005-181253 | 7/2005 |
| JP | 2005207763 | 8/2005 |
| JP | 2007-106090 | 4/2007 |
| JP | 2008309643 | 12/2008 |
| JP | 2008309644 | 12/2008 |
| JP | 2008309646 | 12/2008 |
| WO | WO 2010/071657 A1 | 6/2010 |

OTHER PUBLICATIONS

PCT International Search Report for PCT/US2009/068641, Dated Mar. 29, 2010—9 pages.

Allan Bereczki, Giuseppe A. Cirino, and Spero Penha Morato, "Tridimensional Laser Engraving of Industrial Injection Moulds, for Fresnel Surface Generation", Annals of Optics, 2006—4 pages.

* cited by examiner

METHOD FOR PREDICTION AND CONTROL OF HARMONIC COMPONENTS OF TIRE UNIFORMITY PARAMETERS

FIELD OF THE INVENTION

The present subject matter generally concerns technology for characterizing different harmonic components of tire uniformity performance parameters, such as high speed radial force variation and uneven mass distribution. Characterization and prediction of such tire uniformity parameters and others subsequently may be used to sort or correct manufactured products and/or to improve manufacturing aspects thereof.

BACKGROUND OF THE INVENTION

Tire non-uniformity relates to the symmetry (or lack of symmetry) relative to the tire's axis of rotation in mass, geometric or stiffness characteristics. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Many different factors can contribute to the presence of non-uniformities in tires, even when the tires are built under seemingly identical process conditions. Examples of such factors include the location of product start points and/or joint overlap locations for one or more of the many complex tire building products and/or steps. Exemplary products include the casing textile plies, the belt plies, bead rings, the inner liner, the tread and other rubber layers. Steps involving these and other products include the application of such products to a form or drum, placing the resulting green structure in a mold or press and subjecting the structure to heat and pressure to shape and cure the rubber products and bond the materials into an integrated unit.

Tire uniformity characteristics, or parameters, are generally categorized as dimensional or geometric variations (radial run out (RRO) and lateral run out (LRO)), mass variation or uneven mass distribution, and rolling force variations (radial force variation, lateral force variation and tangential force variation, sometimes also called longitudinal or fore and aft force variation). Measuring one or more of the above parameters at high speed provides high speed uniformity (HSU) characteristics for a tire. Uniformity measurement machines often calculate the above and other uniformity characteristics by measuring force with a load cell located either at the tire hub or in a road wheel or the like.

One type of uniformity parameter that is of particular interest in the automotive industry corresponds to radial force variations at generally high speeds, such as those in excess of about 25 mph. Many tire manufacturers have started implementing or are being pressured to implement HSU control by addressing high speed radial force variation (HSRFV). Direct measurement of tire HSU parameters, including HSRFV, however, has been difficult and quite costly, making industrial control rather difficult. To avoid the expense and difficulty associated with direct high speed uniformity measurement in the factory setting, some in the tire industry have focused on predicting HSU by correlating more readily accessible low speed uniformity (LSU) measurements to various HSU attributes. These correlations have ranged on a continuum from purely phenomenological to purely statistical in nature, but many have had only limited success.

One known attempt at predicting tire HSU is disclosed in U.S. Pat. No. 5,396,438 (Oblizajek), which predicts HSU based on multiple low speed parameters such as radial run out (RRO), instantaneous rolling radius (IRR), and radial force variation (RFV) as obtained on low speed uniformity machines.

Yet another example related to aspects of high speed uniformity is found in U.S. Pat. No. 6,065,331 (Fukasawa), which predicts higher order components of high speed uniformity based on low speed uniformity measurements.

Another known technique for predicting and controlling tire HSU is disclosed in U.S. Pat. No. 7,082,816 (Zhu), owned by the present Applicant. In the Zhu '816 patent, technology is disclosed for characterizing both uneven mass distribution and high speed uniformity of a tire based on a functional model derived by representing a tire as a generally circular flexible ring. Although this approach has proven value, the functional model employed in the Zhu '816 patent can sometimes be difficult to implement in practice. In addition, such model does not account for certain aspects of crown deformation. Still further, modeling the tire as a simple ring fails to account for differences in tire structure and performance over a range of lateral locations across a tire crown. Finally, such model sometimes lacks flexibility and ease of implementation because it is locked into a phenomenological model with various parameter assumptions tied thereto.

Although known technology for characterizing tire high speed radial force variation and uneven mass distribution and affecting associated aspects of tire manufacturing have been respectively developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved methodology has been provided to electronically predict certain tire parameters such as high speed radial force variation and uneven mass distribution based on other measured values, such as high speed radial run out and others.

One exemplary embodiment of the present subject matter relates to a method of electronically determining uneven mass distribution levels for a production tire based on measured radial run out values. Such method may include various steps, including electronically establishing a calibration curve for one or more test tires that correlates at least one harmonic of interest for measured radial run out to electronically calculated centripetal force. A tire measurement apparatus and associated computer processor then are used to obtain a composite waveform representing high speed and low speed radial run out for a production tire having unknown uneven mass distribution. At least one harmonic of interest can be isolated from the measured radial run out values, for example, using Fourier transformation techniques. The at least one harmonic of interest of the measured radial run out for the production tire then is mapped electronically to centripetal force using the calibration curve. The uneven mass distribution for the production tire is calculated electronically from the centripetal force identified from the electronically mapping step. In more particular embodiments of the above-referenced technology, the calibration curve is obtained by first measuring on a tire measurement apparatus initial high speed radial run out ($HSRRO_{h\text{-}0}$) and low speed radial run out ($LSRRO_{h\text{-}0}$) for a harmonic of interest h for one or more test tires. Various patches having (j=1, 2, . . . , J) different levels of patch mass variation are iteratively added to each of the one or more test tires and at which point high speed radial run out ($HSRRO_{h\text{-}j}$) and low speed radial run out ($LSRRO_{h\text{-}j}$) for the harmonic of interest h for the one or more test tires are again measured. The high speed and low speed radial run out measurements for each different patch mass variation are used to calculate a differential radial run out value ($\Delta RRO_h$) defined as $\Delta RRO_h = \Delta RRO_{h\text{-}j} - \Delta RRO_{h\text{-}0} = (HSRRO_{h\text{-}j} - LSRRO_{h\text{-}j}) - (HSRRO_{h\text{-}0} - LSRRO_{h\text{-}0})$. The centripetal force ($CF_h$) also is calculated for each patch mass variation (j=1, 2, . . . , J) added to the one or more test tires. Centripetal force can be calculated from the rotational speed at which such measurements are obtained, and certain known patch parameters by the following equation:

$$CF_h = \omega^2 m R_\theta \left( \frac{\sin\frac{Lh}{2R_\theta}}{\frac{Lh}{2R_\theta}} \right)$$

where $\omega$ is the rotational speed of the tire at high speed, m is the mass of the patch, h is the harmonic component number of interest, L is the length of the patch and $R_0$ is the nominal tire radius. The calculated centripetal force values ($CF_h$) then are plotted versus the corresponding radial run out values ($\Delta RRO_h$) for each different combination of patch mass variation and tire rotational speed to obtain a plurality of data points. The plotted data points can be interpolated to obtain a final calibration curve.

Another exemplary embodiment of the present subject matter concerns a method of electronically determining high speed radial force variation for a production tire based at least in part on measured radial run out values and a speed-dependent calibration model. Such method may include initial steps of measuring radial run out and radial force variation for a plurality of test tires at both low speed and at high speed. Such measurements may then be used to electronically calculate coefficients for generating a speed-dependent calibration model relating low speed radial force variation and radial run out to high speed radial force variation. The speed dependent calibration model can then be used to predict high speed radial force variation for one or more production tires. For example, radial run out for a production tire may be measured by the difference between the tire radius measured at high speed and the tire radius measured at low speed. Radial force variation for the production tire may also be measured at low speed. Finally, the high speed radial force variation can be electronically calculated by applying the radial run out and radial force variation measurements for the production tire to the speed-dependent calibration model.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
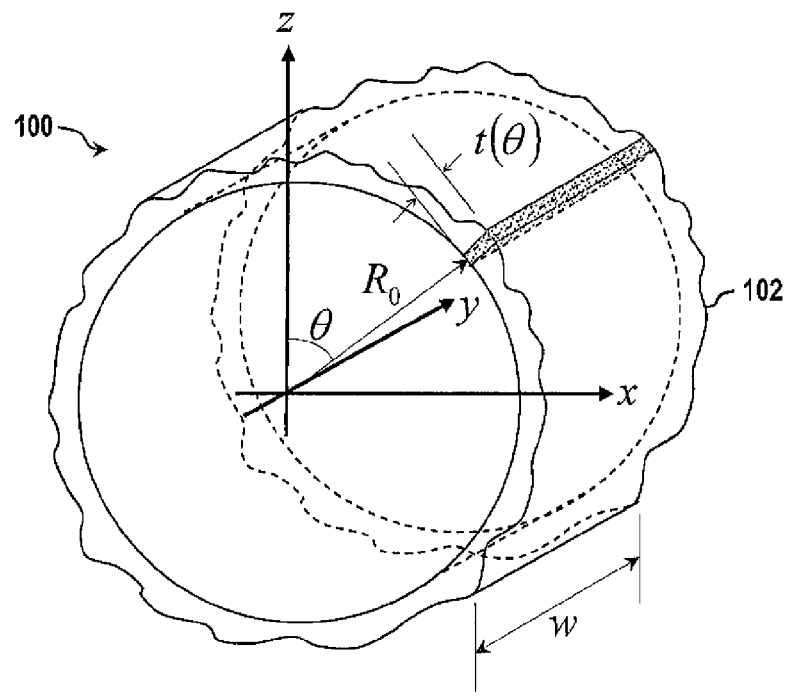
FIG. 1 provides a schematic perspective view of a tire with uneven mass distribution.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is generally concerned with features and steps for predicting and controlling tire uniformity parameters such as high speed radial force variation and uneven mass distribution based on generated prediction models and other more easily measurable quantities, such as radial run out. For example, some embodiments of the subject technology involve determining a predicted value of uneven mass distribution from measured radial run out. In other embodiments of the subject technology, high speed radial force variation is predicted from measured low speed radial force variation and radial run out.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 10:
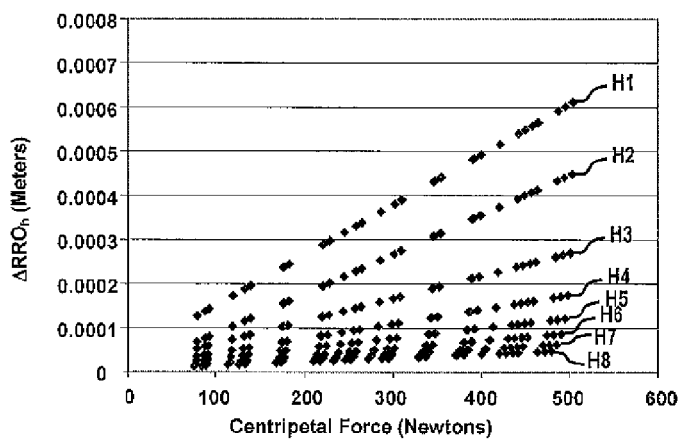
FIG. 10 provides a graphical illustration of multiple calibration curves for different harmonic components of measured radial run out ($\Delta RRO_h$), each calibration curve mapping the measured $\Delta RRO_h$ in meters (m) to centripetal force measured in Newtons (N)
Figure 11:
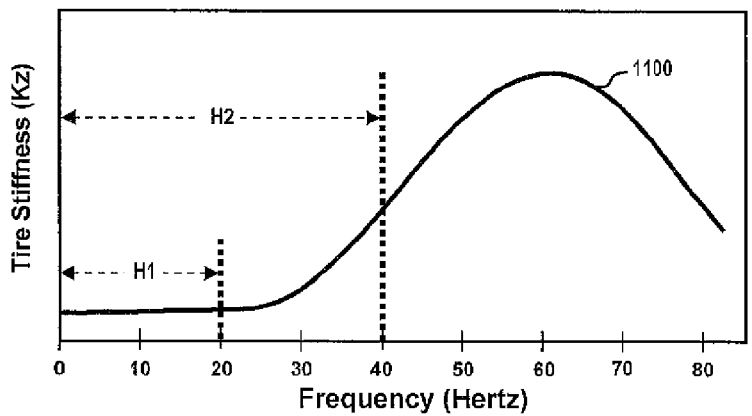
FIG. 11 provides a graphical representation of the increase in stiffness levels versus tire speed for a rotating tire.
Figure 12:
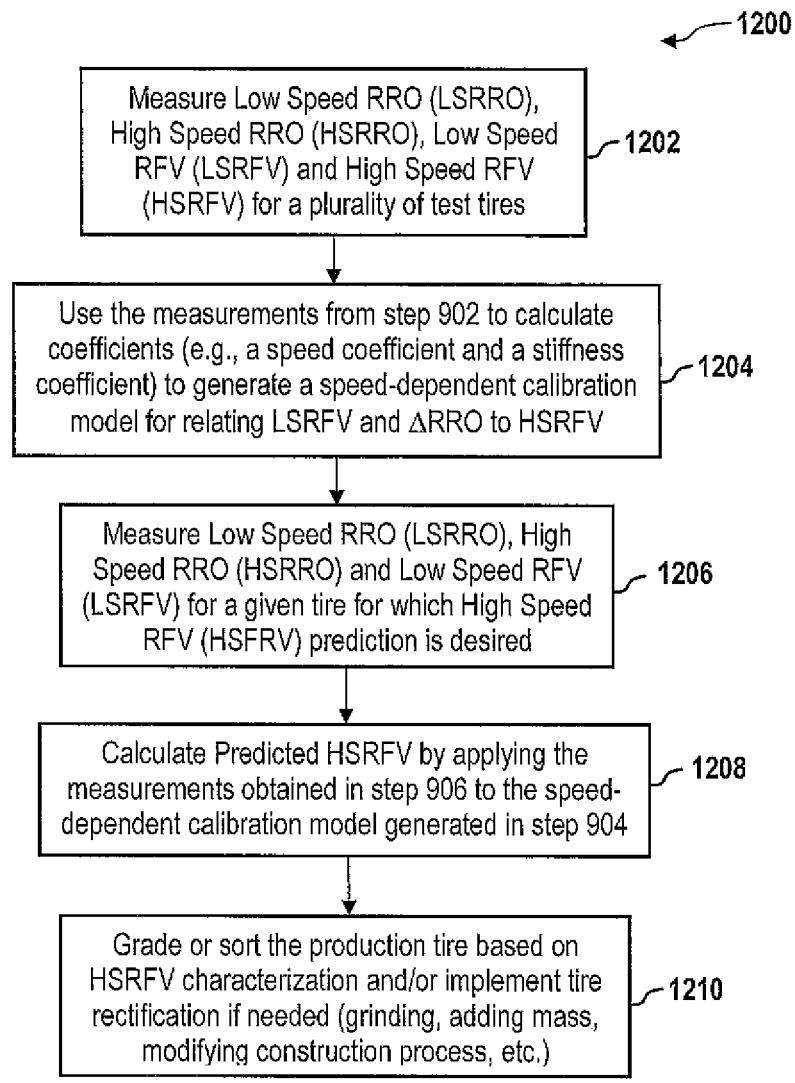
FIG. 12 provides a flow chart of exemplary steps in a method of electronically determining high speed radial force variation for a production tire based on measured radial run out values and a speed-dependent calibration model.
Figure 13:
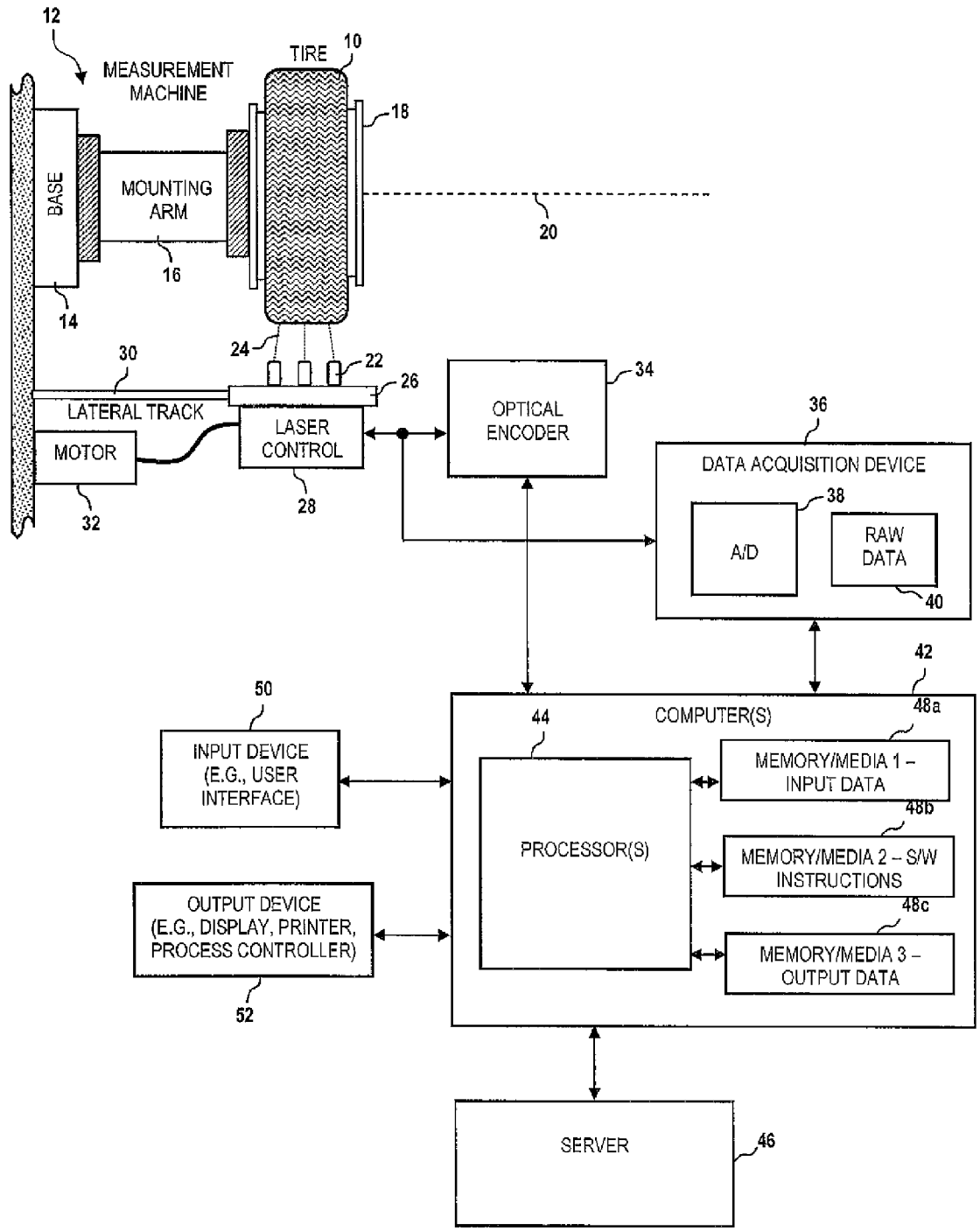
FIG. 13 provides a block diagram of exemplary hardware components in a tire measurement system in accordance with the presently disclosed technology, including various exemplary measurement components as well as post-measurement processing components.

Referring now to the drawings, a brief discussion of the theory behind the relationships among uneven mass distribution, radial run out and related force variations is presented relative to FIGS. 1-4. FIG. 5 shows how tire measurements optionally can be obtained at one or more tracks defined at different lateral locations along a tire crown. An exemplary method of determining uneven mass distribution from radial run out and related information is presented with reference to FIGS. 6-10, while FIGS. 11 and 12 are directed to an exemplary method of determining high speed radial force variation from low speed radial force variation, radial run out and related information. FIG. 13 describes exemplary hardware features that may be used to obtain selected tire parameter measurements discussed herein, and FIG. 13

Figure 2A:
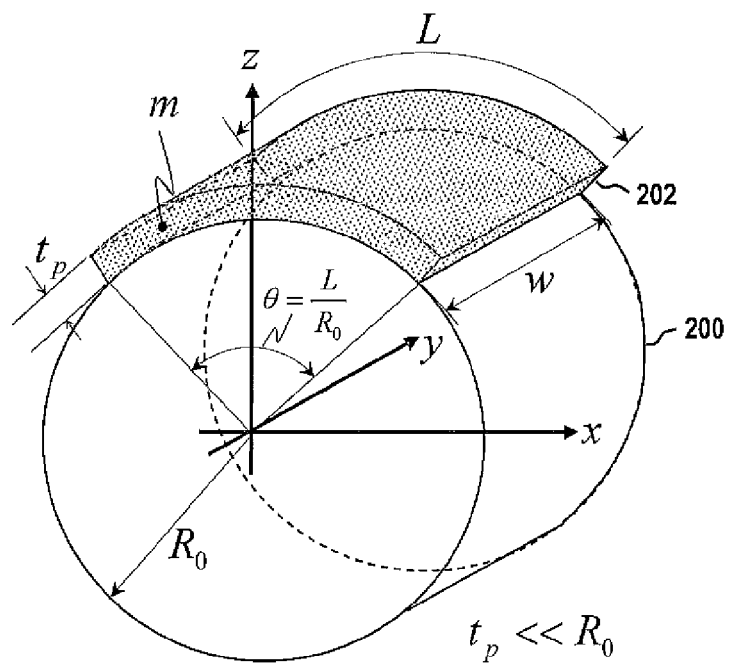
FIG. 2A provides a schematic perspective view of a tire with uneven mass distribution represented by a uniform patch at the tire crown.
Figure 2B:
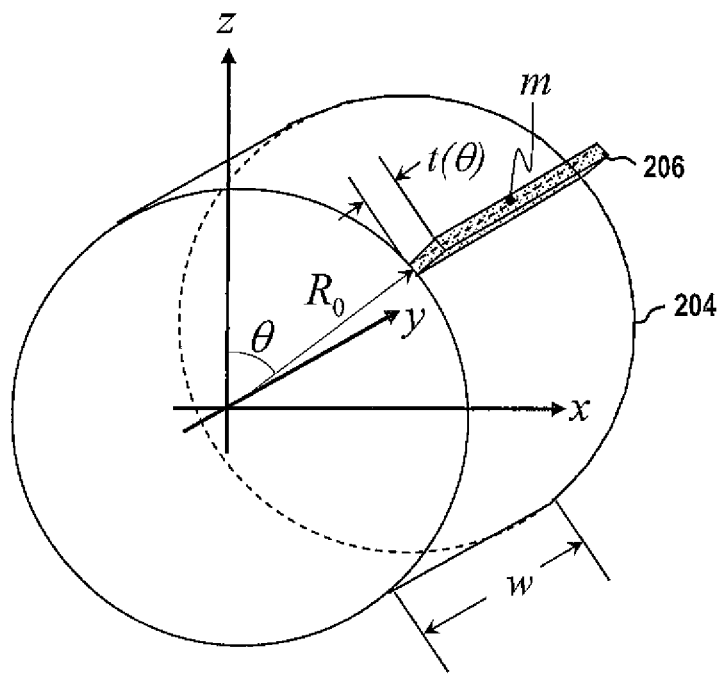
FIG. 2B provides a schematic perspective view of a tire with uneven mass distribution represented by a concentrated mass at the tire crown.

Referring first to FIGS. 1, 2A and 2B, such drawings are intended to schematically represent the modeling of uneven mass distribution in a tire. In general, uneven mass distribution corresponds to the circumferential variation of the product of mass and radius. When rotated, the first harmonic of uneven mass distribution causes a rotating force at the hub center; it is typically referred to as mass imbalance or mass unbalance. This force is eliminated when appropriate balance weights are placed on the tire rim. When the distribution of mass around a tire is more uneven or nonuniform, a greater possibility exists of increased tire geometric variation (e.g., run out and the like) and/or force variations. Although tire mass can be unevenly distributed in different locations across three dimensions of a tire carcass (e.g., as depicted in FIG. 1), it is often useful to model such mass distribution as a uniform patch of mass (e.g., as depicted in FIG. 2A) or as a concentrated mass (e.g., as depicted in FIG. 2B). Each of FIGS. 1, 2A and 2B displays schematic tire representations relative to a three-dimensional coordinate system, where x is the horizontal coordinate, y is the lateral coordinate, and z is the vertical coordinate.

For example, referring to FIG. 1, a tire 100 has a crown product (e.g., tread) 102 circumscribing a uniform carcass. The tire 100 has a nominal radius $R_0$ and width w. The uneven mass distribution (UMD) associated with the crown product 102 in FIG. 1 is characterized by a density $\rho$, and a thickness t as a function of angular position $\theta$. The crown product 102 is assumed to be relatively thin, and as such the thickness $t(\theta)$ is much less than the nominal radius $R_0$, or $t(\theta) \ll R_0$. An equation relating the uneven mass distribution ($UMD_h$) for a given harmonic h is given by the following:

$$UMD_h = \frac{\pi}{2} \rho w R_0^2 t_h, \qquad (1)$$

where $t_h$ is equal to the peak-to-peak thickness variation at harmonic h. If density ($\rho$) is measured in kilograms per meter cubed (kg/m$^3$), and width (w), radius ($R_0$) and thickness variation ($t_h$) are all measured in meters (m), then uneven mass distribution is provided in units of kilograms*meters (kg*m).

Referring now to FIG. 2A, a special case of the general equation (1) identified relative to FIG. 1 applies when uneven mass distribution is considered for a tire 200 having a relatively thin patch 202 affixed to a location along the crown of a relatively uniform carcass of radius $R_0$. Patch 202 has a length L, a mass m, width w, a substantially uniform thickness $t_p$ and density $\rho$. Recalling that the inscribed angle ($\theta$) for patch 202 can be defined as $$\theta = \frac{L}{R_\theta},$$

and the equation for patch mass is $m = \rho L w t_p$, equation (1) above can be rewritten as:

$$UMD_h = \frac{m}{L} R_\theta^2 \int_{-\frac{L}{2R_\theta}}^{\frac{L}{2R_\theta}} \cos h\theta \, d\theta = mR_\theta \left( \frac{\sin\frac{Lh}{2R_\theta}}{\frac{Lh}{2R_\theta}} \right) \qquad (2)$$

Referring now to FIG. 2B, another special case of the general equation (1) identified relative to FIG. 1 applies when uneven mass distribution for a tire 204 corresponds to a concentrated mass 206. In such case, the length (L) of the patch goes to zero. Thus, the limit of equation (2) as L approaches zero is $UMD_h = mR_0$ for all harmonic components of uneven mass distribution.

When a tire has some uneven mass distribution as described above relative to equation (2), the tire can be modeled like a rotating spring with one end fixed and the free end attached to a differential mass, for example the masses 202 and 206 shown in FIGS. 2A and 2B. The centripetal force (CF) from rotation will stretch the spring proportionally to the product of the tire's differential mass and the rotational speed squared. The centripetal force (CF) and uneven mass distribution (UMD) can also be directly related to the radial run out value for a rotated tire. More particularly, uneven mass distribution ($UMD_h$) measured in kilogram-meters (kg*m) is related to centripetal force ($CF_h$) measured in Newtons (N) and radial run-out ($\Delta RRO_h$) measured in meters (m) by the following relationships, where $K_h$ is the h-harmonic stiffness constant measured in kilograms per second squared (kg/s$^2$), and $\omega$ is the rotational speed of the tire in radians per second (rad/s):

$$CF_h = UMD_h * \omega^2 = K_h * \Delta RRO_h. \quad (3)$$

Figure 3:
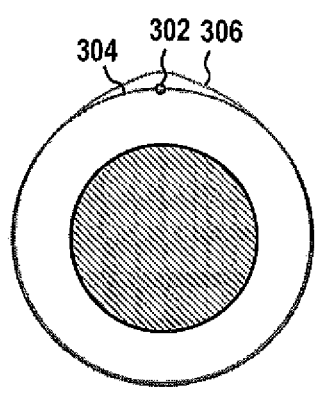
FIG. 3 provides an exemplary graphical representation of two-dimensional tire shape when a given point mass is added to the tire and the tire is rotated at different speeds, thus illustrating resultant radial run out.
Figure 4:
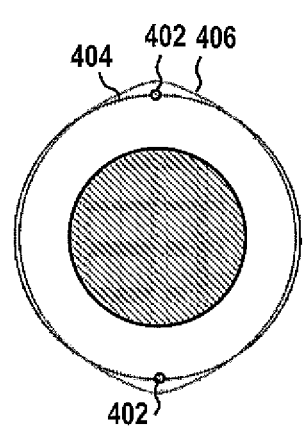
FIG. 4 provides an exemplary representation of two-dimensional tire shape when two point masses are added to the tire and the tire is rotated at different speeds, thus illustrating resultant radial run out.
Figure 5:
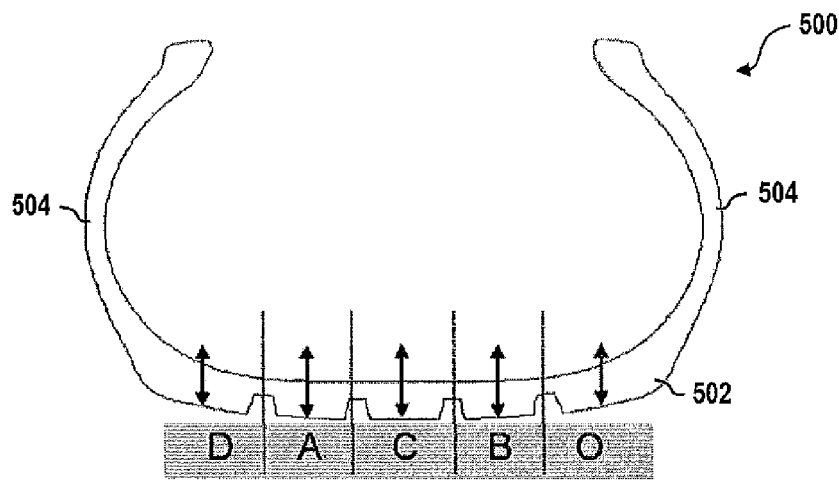
FIG. 5 provides a cross-sectional view of an exemplary tire depicting different possible tracks at which radial run out or other tire measurements may be obtained in accordance with the presently disclosed technology.

The dimensional effect of uneven mass distribution as manifested in radial run out of a tire can be better appreciated with reference to FIGS. 3 and 4. Radial run out generally corresponds to the geometric deformation of the tire present when the tire is rotating at low or high speeds. Like most uniformity parameters measured for a tire, a composite waveform of run out measurements can be decomposed into discrete harmonic components. Most noticeable tire effects are manifested in the lower harmonics. FIG. 3 depicts first harmonic radial run out effects, while FIG. 4 depicts second harmonic radial run out effects.

Referring now to FIG. 3, uneven mass distribution contributing to the first harmonic of radial run out can be represented by a single concentrated mass 302. When a tire including mass 302 is stationary or rotated at a low speed, a surface measurement of the tire may be represented by the tire in a first state 304, which may correspond to radial run out measurements obtained when the tire is stationary or rotating at a low speed. The tire is also shown in a second state 306, which may correspond to radial run out measurements obtained when the tire is rotating at a high speed.

FIG. 4 depicts another exemplary representation of tire deformation due to uneven mass distribution of a tire, this time having two point masses 402 located thereon. Such two point masses 402 are generally configured such that they are about one-hundred eighty degrees (180°) out of phase with one another. The tire in FIG. 4 is shown in a first state 404, which again may correspond to radial run out measurements obtained when the tire is stationary or rotating at a low speed. The tire is also shown in a second state 406, which may correspond to radial run out measurements obtained when the tire is rotating at a high speed.

The relationship of uneven mass distribution and radial run out to radial force variation can also be appreciated with reference to FIGS. 3 and 4. For tires having negligible stiffness variation, the primary mechanism of high speed radial force variation (HSRFV) is based on the centrifugation of the mass uneven distribution at high speed, in other words the radial run out. As such, it should be appreciated that as the centrifuged portion of the tire enters the contact patch, an additional radial force is required to crush this incremental increase in run out. This exemplifies how radial force variation depends from radial run out. The disclosed technology provides mechanisms for relating radial run out data to either uneven mass distribution or directly to high speed radial force variation.

Figure 6:
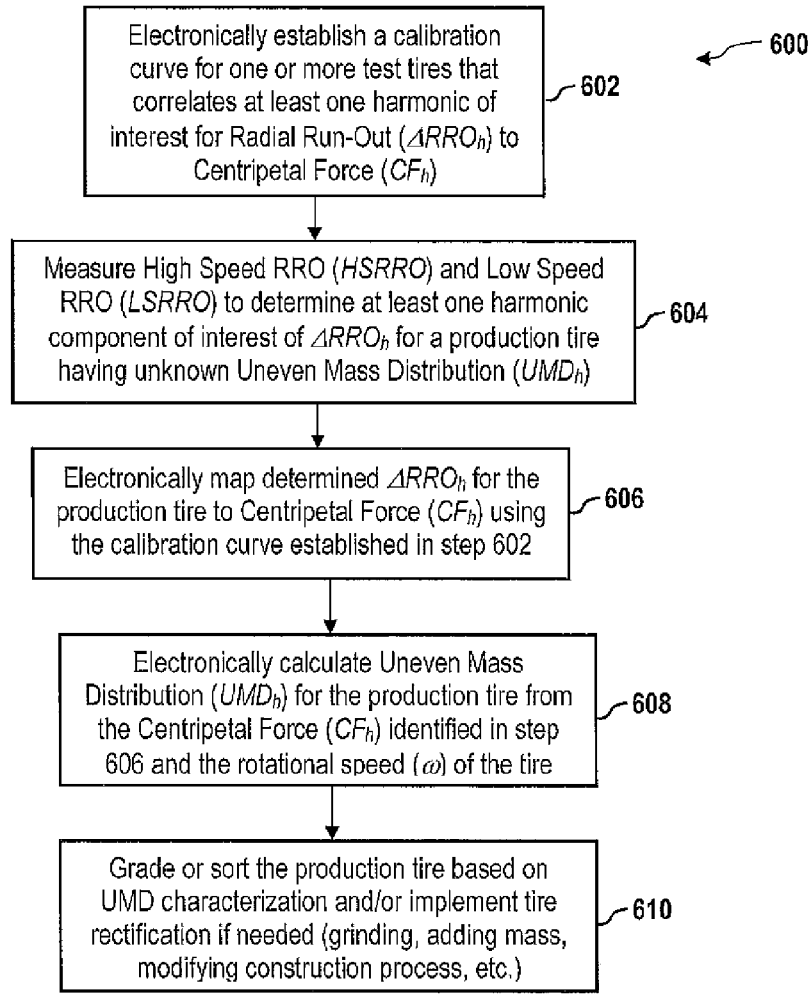
FIG. 6 provides a flow chart of exemplary steps in a method of electronically determining uneven mass distribution levels for a production tire based on measured radial run out values.

Referring now to FIG. 6, exemplary steps in a method 600 for electronically determining uneven mass distribution levels for a production tire based on measured radial run out values is disclosed. In further accordance with method 600, a first step 602 may involve electronically establishing a calibration curve for one or more test tires that correlates at least one harmonic of interest for measured radial run out to centripetal force.

Figure 7:
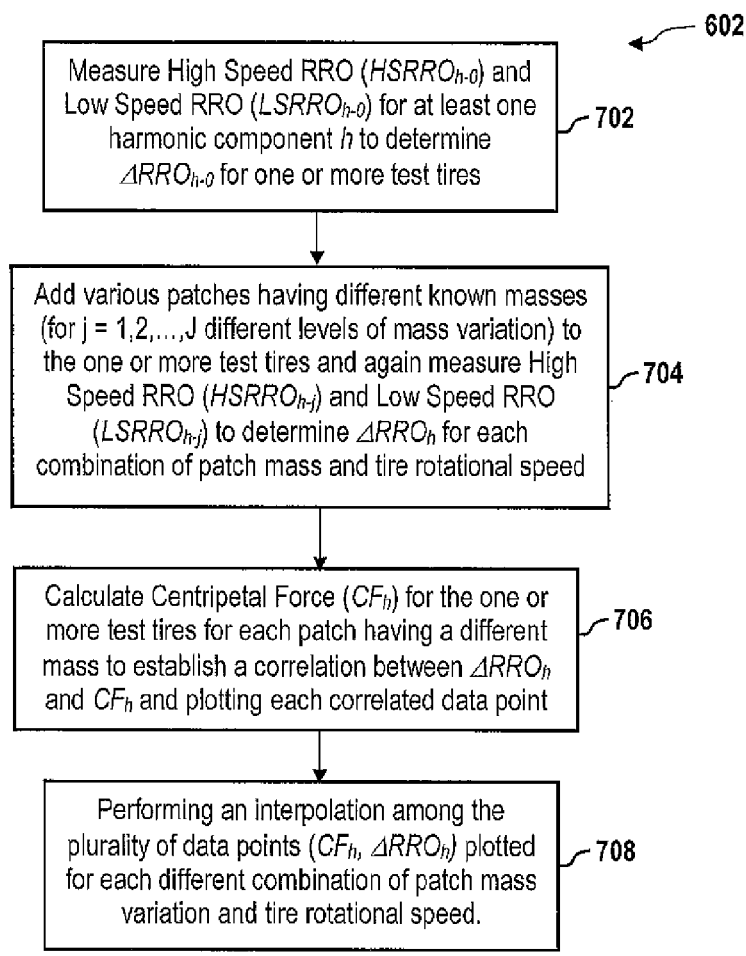
FIG. 7 provides a flow chart of exemplary steps in a method of electronically establishing a calibration curve for a given test tire in accordance with the method of electronically determining uneven mass distribution set forth in FIG. 6.

More particular details for how to generate the calibration curve in step 602 are shown in FIG. 7. For example, a first step 702 may involve measuring initial radial run out values for one or more test tires. The number of test tires for which the initial run out measurements are obtained in step 702 may vary. In one example, between five and twenty may be used, although it should be appreciated that a lesser or greater number of test tires is possible. By using more test tires, it may be possible to achieve better statistical averages and reduced dispersion concerns for purposes of the generated calibration curve.

In step 702 and in other instances throughout the specification describing "radial run out" measurements, it should be appreciated that such radial run out parameter ($\Delta RRO$) refers to the actual out of round variation in the radius of a tire, and is a differential parameter representing the difference between the radial run out of a tire measured at high speed (HSRRO—high speed radial run out) and the radial run out of a tire measured at low speed (LSRRO—low speed radial run out). In other words, $\Delta RRO = HSRRO - LSRRO$.

It should be further appreciated that step 702 and other instances discussing radial run out and other measurements may focus not on the as-measured composite waveform of the measured parameter, but on one or more harmonic components thereof. The individual harmonics may be obtained by applying Fourier decomposition to the composite signal. As known in the art, Fourier analysis of a signal identifies the harmonics of that signal, where a harmonic is a sinusoidal (sum of sine and cosine terms) curve that passes an exact integral number of times through the composite waveform. Each harmonic component can be represented as its own waveform, or can be characterized as a vector having some magnitude and phase, where the magnitude or length of the vector is the peak-to-peak value of the harmonic waveform and the vector phase corresponds to the angle where the first peak of the harmonic waveform occurs. For waveforms consisting of a number of data points (d) around a tire (e.g., d=2048 data points), 1024 or d/2 harmonics can be calculated. The sum of these 1024 harmonics will pass through each of the 2048 data points. In general, the harmonies of interest that often provide the most useful information for analyzing and controlling tire performance parameters are the lower harmonics (e.g., H1, H2, ..., H16 or so). In some embodiments, only the first one, two or three harmonics (H1, H2, H3) are analyzed, but more than just the first harmonic (H1) is preferred in many embodiments to obtain meaningful results. Because $\Delta RRO$ is considered for specific harmonic components thereof, the defined relationship for such parameter is best described by equation (4) below:

$$\Delta RRO_h = HSRRO_h - LSRRO_h. \quad (4)$$

Because the initial measurements obtained in step 702 are for test tires having no patch, the measured values for high speed and low speed radial run out are referred to as $HSRRO_0$ and $LSRRO_h$, respectively.

After initial measurements are obtained in step 702, additional radial run out measurements are obtained in step 704 after adding a patch having known mass to the one or more test tires. For example, a single patch having a known mass is added to each test tire and the same high speed and low speed measurements representing the radial deflection of the tire periphery are again measured to determine $\Delta RRO_h$. By introducing a new variable j to refer to the different iterations of patch masses added to a tire, the different $\Delta RRO_h$ measurements obtained for the different patches can be represented as $\Delta RRO_{h-j}$. Just as $\Delta RRO_{h-0}$ for j=0 corresponds to the initial measurements obtained in step 702 for an initial tire having no patch, $\Delta RRO_{h-1}$, $\Delta RRO_{h-2}$, ..., $\Delta RRO_{h-J}$ are measured for the J different levels of patch mass variation introduced in step 704, where j=1, 2, ..., J.

The step of adding a patch having known mass and measuring radial run out may be repeated for various patches having different known masses. Different exemplary masses for patches added to the tire can range from 10-100 grains in one embodiment, 20-60 grains in another exemplary embodiment, or other ranges or subranges of patch masses. Different exemplary lengths for patches include 50.8 mm, and different exemplary densities for the rubber or other material from which the patches are made include 2.7 g/cm$^3$. When generating a calibration curve, the mass, length, density and the like will be provided as known patch parameters. It may be preferred in some embodiments to use at least a minimum number of levels (J) of mass variation (e.g., two-ten different levels in one exemplary embodiment and/or at least five different levels in another exemplary embodiment) to cover the expected range for a target population of production tires. In other embodiments, multiple patches of known mass may be added to each test tire in order to potentially establish more accurate calibration curves for higher harmonic components of interest of radial run out.

Once $\Delta RRO_{h\text{-}j}$ measurements are obtained in step 702 (j=0) and in step 704 (j=1, 2, . . . , J), the centripetal force ($CF_h$) for each tire having a patch added to it (i.e., the tires for which j=1, 2, . . . , J) is calculated according to the following equation (5), which follows from equations (2) and (3) above.

$$CF_h = UMD_h * \omega^2 m R_\theta \left( \frac{\sin \frac{Lh}{2R_\theta}}{\frac{Lh}{2R_\theta}} \right) \quad (5)$$

For those same tires measured in step 704, the calculated centripetal force ($CF_h$) can then be plotted relative to corresponding radial run out values defined in equation (6):

$$\Delta RRO_h = \Delta RRO_{h\text{-}j} - \Delta RRO_{h\text{-}0}, \quad (6)$$

for each mass variation level j=1, 2, . . . , J.

Figure 8:
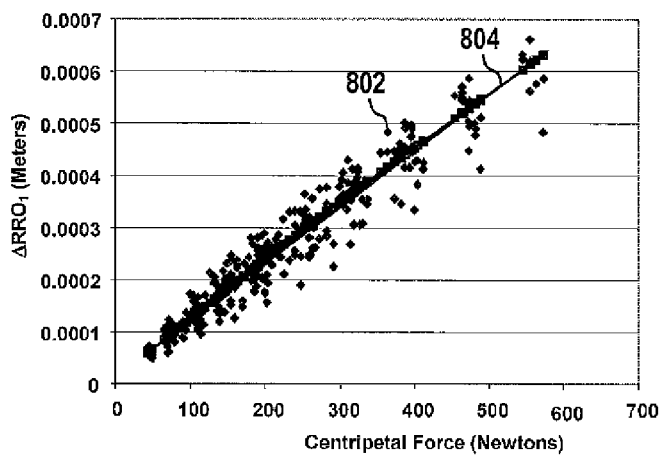
FIG. 8 provides a graphical illustration of an exemplary calibration curve generated in accordance with the exemplary steps set forth in FIG. 7.

By knowing the measured radial run out value ($\Delta RRO_h$) and having a calculated centripetal force value ($CF_h$) for each tire and patch combination, a plurality of data points can be generated, such as represented by the diamond shaped data points 802 in FIG. 8. The diamond shaped data points 802 on the graph of FIG. 8 represent the measured radial run out data defined by equation (6) above versus the calculated centripetal force for a variety of mass and speed combinations. The ordinate axis plots the measured ($\Delta RRO_h$) as defined by equation (6) above for the first harmonic of radial run out measured in meters (m). The abscissa plots the calculated centripetal force ($CF_h$) corresponding to each respective ordinate value. Once an entire set of data points are obtained (e.g., data points 802), a calibration curve 804 can be constructed by performing an interpolation among the data points.

Figure 9:
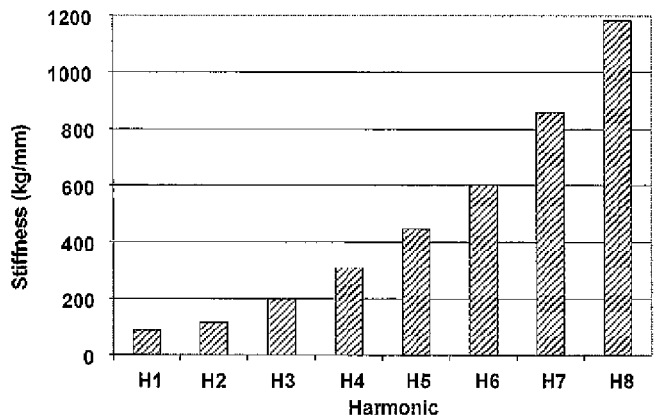
FIG. 9 provides a graphical representation of tire stiffness levels measured in kilograms per millimeter (kg/mm) for different harmonic components (H1, H2, . . . , H8) of measured radial run out.

It should be appreciated that different calibration curves generally will be needed for different test tires as well as different harmonic components of interest. This is due to the fact that a tire has been determined in accordance with the disclosed technology to have different stiffness levels for different harmonics. An example of this phenomenon is illustrated in FIG. 9, which plots exemplary stiffness levels in kilograms per millimeter (kg/mm) for each of the eight lowest harmonic components (H1, H2, . . . , H8) of radial run out for a tire. At least in part because of these varied stiffness levels, different calibration curves will be needed for different harmonics, as shown in FIG. 10. FIG. 10 plots data points that may ultimately be interpolated among to generate calibration curves for the eight different harmonic components H1, H2, . . . , H8 referenced in FIG. 9. Because the change in calibration curve is smaller as the harmonic number increases, it may be possible at some point to obtain a single calibration curve that could be used for a certain predetermined number of higher harmonics.

Referring again to FIG. 6, once a calibration curve has been established in step 602 for one or more respective harmonics of interest of radial run out, radial run out measurements can be obtained in step 604 for a production tire having unknown uneven mass distribution ($UMD_h$). The harmonic component of interest of the measured radial run out ($\Delta RRO_h$) from step 604 is then mapped in step 606 to centripetal force ($CF_h$) using the calibration curve generated in step 602. Once the centripetal force ($CF_h$) is determined, the uneven mass distribution ($UMD_h$) of the production tire is then calculated in step 608 from equation (3) above based on the known values of the centripetal force ($CF_h$) and the rotational speed ($\omega$) at which the radial run out measurements were obtained.

Once the uneven mass distribution is determined in accordance with the present subject matter, a variety of different resultant applications can be implemented in step 610. In one exemplary embodiment, a quality characteristic associated with the analyzed production tire is electronically identified. For example, such quality characteristic may correspond to a grade (A, B, C, D, F), a label (e.g., acceptable or unacceptable for delivery to a customer) or any other quality characteristic that may be associated with one or more categories having predefined limits of ranges for uneven mass distribution within a tire. Such process may be implemented electronically by a computer comparing the determined uneven mass distribution levels with certain electronically defined ranges for the quality characteristics. In another exemplary embodiment of the disclosed technology, depending on the determined level of uneven mass distribution in a production tire, such tire may also be subjected to a rectification step such as grinding or adding extra mass to the production tire to reduce levels of uneven mass distribution.

The uneven mass distribution determination described with reference to FIGS. 6-10 is advantageous because it can be determined from radial run out measurements, it accounts for different tire stiffness levels across different harmonics, and accounts for deformation across a tire crown in a more accurate model when considering different track locations.

Referring now to FIGS. 11 and 12, such figures illustrate exemplary aspects of a method for determining and controlling high speed radial force variation without having to measure such parameter directly for production tires. Advantages of the disclosed method for determining high speed radial force variation are realized at least in part from the utilization of a new prediction model that accounts for tire stiffness changes introduced at different levels of tire rotational speed, particularly those applicable to higher harmonics. This solution was only realized after encountering problems with other prediction models, at which point the present inventors discovered that tire stiffness levels change between low and high speeds, especially for harmonics greater than H1. As such, for harmonics greater than H1, a high speed radial force variation prediction model needs to incorporate a speed amplification factor which would represent the tire stiffness increase due to the speed increase.

The graph in FIG. 11 illustrates the phenomenon of stiffness increase versus speed described above, and attributes it to interaction with the tire's first radial resonance. For example, curve 1100 represents the amplitude level of radial tire stiffness ($k_z$) plotted versus frequency in Hertz (Hz). The frequency levels plotted along the abscissa are equal to the speed times the harmonic rank, i.e., $$f = \frac{\omega h}{2\pi},$$

where h is the harmonic rank (first harmonic, second harmonic, etc.) and $\omega$ is the rotational speed of the tire. The tire stiffness level remains generally level over a frequency range from about 0-20 Hz (the frequency range most affecting contributions to the first harmonic H1). Tire stiffness levels then begin to increase between 20-40 Hz, which subrange is included in the 0-40 Hz frequency range that affects contributions to the second harmonic H2. The tire stiffness curve peaks near the tire's first natural resonant frequency of about 70 Hz.

Referring now to FIG. 12, a method 1200 for electronically determining high speed radial force variation in production tires without having to measure such parameter directly uses a speed-dependent calibration model defined by the following equation:

$$HSRFV_h = [1+\beta v^2][LSRFV_h + \alpha_h * \Delta RRO_h], \tag{7}$$

where $HSRFV_h$ is the h harmonic component of High Speed Radial Force Variation, $\beta$ is a speed coefficient, $v$ is the rotational frequency of the tire at high speed, $LSRFV_h$ is the h harmonic component of Low Speed Radial Force Variation, $\alpha_h$ is a stiffness coefficient, and $\Delta RRO_h$ is the differential radial run out as defined by equation (4) above.

In order to utilize the model defined by equation (7), a first step 1202 in method 1200 involves obtaining a plurality of measurements for a plurality of test tires (e.g., 2-50 test tires). In particular, step 1202 involves measuring the tire radius while rotating at low speed (LSRRO) and the tire radius while rotating at high speed (HSRRO) to determine the radial run out ($\Delta RRO$) for a harmonic component of interest h. In addition, the low speed radial force variation (LSRFV) and high speed radial force variation (HSRFV) for the test tires are measured in step 1202. Based on the known results for the plurality of test tires, the speed and stiffness coefficients $\alpha_h$ and $\beta$ can be calculated in step 1204. Once the stiffness coefficients are calculated as part of step 1204 over a set of test tires, the speed-dependent calibration model based on equation (7) is complete and can be applied to a set of production tires.

Referring still to FIG. 12, LSRRO, HSRRO and LSRFV are measured for a production tire in step 1206. These measurements are then applied to the speed-dependent calibration model in step 1208 in order to determine (by calculating a predicted value for) HSRFV. A production tire whose HSRFV value has been determined in step 1208 can then be further affected in step 1210 by grading or sorting the production tire based on its HSRFV characterization and/or by implementing tire rectification if needed (e.g., such as by grinding, adding mass, modifying the tire construction process, etc.) As discussed earlier, grading or sorting can be implemented by electronically determining a quality characteristic such as a grade, label, etc. that is determined by computer comparison with predetermined categories of high speed radial force variation.

In other embodiments of the disclosed technology, although the above method has been found to be particularly advantageous for indirectly determining higher harmonic components of high speed radial force variation, it may be preferred to apply the above prediction model to such higher harmonics (H2, H3, etc.) while using a different prediction model for first harmonic (H1) determination of HSRFV. One example of a different prediction model for the first harmonic of HSRFV ($HSRFV_1$) is defined by the following equation:

$$HSRFV_1 = [HSRFV_1 + \alpha_1 * \Delta RRO_1], \tag{8}$$

which model is basically a simplification from the speed-dependent model defined by equation (7) when the speed coefficient ($\beta$) equals zero. The same steps would apply as far as developing the model by determining coefficient $\alpha$ from measurements obtained for one or more test tires, and then using that model to predict HSRFV for production tires.

Referring now to FIG. 13, exemplary hardware components used to obtain tire measurements in accordance with the subject technology are illustrated and now discussed. In order to obtain tire measurements in accordance with the present subject matter, a tire 10 is arranged on a mounting fixture within a measurement machine 12 and rotated centrifugally at one or more predetermined speeds. When run out measurements are desired, measurement machine 12 may be configured to operate as a variable speed radial or lateral run out measurement machine. In one embodiment, measurement machine 12 may generally include such exemplary features as a base 14, mounting arm 16 and mounting fixture 18. The mounting fixture 18 serves as a hub having similar qualities to a tire rim or other rigid disk configured to rotate centrifugally around a center line 20. Although the measurement apparatus illustrated in FIG. 13 is shown as accommodating tire mounting and rotation in the substantially vertical direction, similar to how a tire would rotate along a road surface, it should be appreciated that other mounting orientations are possible. For example, the tire and associated measurement equipment can alternatively be mounted to accommodate tire rotation in a substantially horizontal configuration.

Referring still to the measurement machine of FIG. 13, one or more sensors 22 are positioned relative to the tire 10. Sensors 22 may operate by contact, non-contact or near contact positioning relative to tire 10 in order to determine the position of the tire surface as it rotates about the center line 20. In one embodiment, sensors 22 are non-contact laser sensors. Each laser sensor includes a laser diode that projects a visible stream of light 24 onto the target surface of tire 10. The light reflected from each target spot is directed through an optical receiving system onto a position-sensitive element. In another example, one or more sensors 22 may correspond to a laser sensor configured to emit a sheet of light as opposed to a single stream or fixed point of light.

FIG. 13 illustrates three sensors 22 in order to obtain multiple sets of measurement data along a plurality of measurement tracks relative to tire 10. It should be appreciated that a fewer or greater number of sensors may be employed. It should be further appreciated that either the tire 10 or sensors 22 may be configured in different placement locations relative to one another. The positioning of laser sensors 22 may be varied in accordance with desired measurement tracks along a tire surface. If laser sensors 22 are mounted relative to a platform 26, the positioning of such platform 26 may be altered based on input to a laser control module 28 such that the platform 26 is capable of being moved along a lateral track 30 by motor 32. The platform 26 may also be moved in an angular position relative to a tire 10 so that inward adjustment of the laser sensors 22 can occur for optimum measurement ranges.

The measurement machine 12 and laser sensors 22 are interfaced with additional hardware components, including an optical encoder 34, data acquisition device 36 and other associated modules to collectively measure tire parameters and obtain raw data. In general, optical encoder 34 helps coordinate the geometric measurements at a plurality of data points around a peripheral surface location of a tire. This may be accomplished by providing a control signal defining a plurality of data points (e.g., 2048 data points at different angular positions around a tire periphery) and another control signal providing a once per revolution index pulse to synchronize data to a reference point on the measured tire. In general, the data acquisition device 36 converts measurements obtained from the sensor(s) 22 from analog to digital format via A/D converter 38 and stores the converted run out measurements as raw data in a memory device 40.

The obtained tire measurements are ultimately provided to a computer 42 for post-measurement processing, optional filtering and additional calculations as needed in accordance with the presently disclosed methods for electronically calculating such parameters as uneven mass distribution and high speed radial force variation. Computer 42 may include one or more processors 44 configured to receive input data including raw measurements of tire parameters, filter and process such measurements, and provide useable output such as data to a user or signals to a process controller. Post-processing and filtering functionality may alternatively be implemented by one or more servers 46 or across multiple computing and processing devices. In general, processor(s) 44 and associated memory/media elements 48a, 48b and 48c are configured to perform a variety of computer-implemented functions (i.e., software-based data services). Such computing/processing devices may be adapted to provide desired functionality by accessing software instructions rendered in a computer-readable form stored in one or more of the memory/media elements 48. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

At least one memory/media element (e.g., element 48b in FIG. 13) is dedicated to storing software and/or firmware in the form of computer-readable and executable instructions that will be implemented by the one or more processor(s) 44. Other memory/media elements (e.g., memory/media elements 48a, 48c) are used to store data which will also be accessible by the processor(s) 44 and which will be acted on per the software instructions stored in memory/media element 48b. The various memory/media elements of FIG. 13 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 13 shows three separate memory/media elements 48a, 48b and 48c, the content dedicated to such devices may actually be stored in one memory/media element or in multiple elements. Any such possible variations and other variations of data storage will be appreciated by one of ordinary skill in the art.

In one particular embodiment of the present subject matter, a first portion of memory/media 48a is configured to store input data for the subject tire measurement system and related processing methods. Input data stored in memory/media element 48a may include raw data measured by the laser sensors 22 and associated components coupled to measurements machine 12. Input data stored in memory/media element 48a may also include predetermined tire parameters, such as but not limited to tire radius, tire width, tire mass, tire pressure, tire radial stiffness, tire tangential stiffness, tire bending stiffness, tire extensional stiffness, tread locations, general tire data and the like. Such predetermined parameters may be pre-programmed into memory/media element 48a or provided for storage therein when entered as input data from a user accessing the input device 50.

Input device 50 may correspond to one or more peripheral devices configured to operate as a user interface with computer 42. Exemplary input devices may include but are not limited to a keyboard, touch-screen monitor, microphone, mouse and the like.

Second memory element 48b includes computer-executable software instructions that can be read and executed by processor(s) 44 to act on the input data stored in memory/media element 48a to create new output data (e.g., filtered data, waveform displays, etc.) for storage in a third memory/media element 48c. Selected portions of the output data may then be provided to one or more peripheral output devices 52.

Output device 52 may correspond to a display such as a monitor, screen, etc., a printer, or a process controller. A process controller may correspond to an output device, controller mechanism or other modular element adapted to assist with tire evaluation processes such as sorting or grading or with structural modification processes such as grinding or implementing manufacturing process adjustments. Evaluation processes, such as sorting or grading, may generally involve determining whether measured tire performance characteristics are below some predetermined limitations. If characteristics are within acceptable limits, then the tires may be identified as acceptable for delivering to a customer. If above acceptable limits, tires may be rejected or subjected to a modification process. An exemplary modification process corresponds to grinding or adding extra mass to the tire at particular determined locations in accordance with tire grinding or mass adding processes as are understood by one or skill in the art of tire manufacturing. Alternatively, the determination of certain tire characteristics by computer 42 may be utilized in a feedback modification to improve selected of the various processes that are involved in tire manufacturing, such as but not limited to steps of applying various layers of rubber compound and/or other suitable materials to form a tire carcass, providing a tire belt portion and tread portion to form the tire crown block, curing the finished green tire, etc.

The radial run out, radial force variation and other measurements disclosed herein as measured, for example, by the hardware equipment of FIG. 13 are sometimes discussed as being obtained at either a "high speed" or "low speed." High speed measurements generally may correspond to those that would be representative of typical highway speeds, while low speeds generally are employed to establish initial performance features of a tire before the introduction of additional attributes present only at higher rotational speeds. For purposes of the present subject matter, a "high speed" at which various measurements may be obtained and analyzed corresponds to a rotational frequency of at least about 600 rpm (about 10 Hertz) in some embodiments, at least about 800 rpm (about 13.33 Hertz) in other embodiments, between about 800 rpm and about 1600 rpm in still further embodiments, or other ranges or subranges between about 600 rpm and about 1800 rpm (10-30 Hz). For purposes of the present subject matter, a "low speed" at which various measurements may be obtained and analyzed corresponds to a rotational frequency of less than about 600 rpm (about 10 Hertz) in some embodiments, less than about 300 rpm (5 Hz) in other embodiments, less than about 100 rpm in still further embodiments, or other ranges or subranges between about 0 rpm and 600 rpm (0-10 Hz).

It should be appreciated that a variety of different features may be applied to the process of obtaining tire parameter measurements in order to generally improve the quality of obtained data points. For example, data averaging over multiple tire revolutions and/or at multiple track locations, data filtering and/or other techniques may be used. Such exemplary features are described in more detail in the following paragraphs and may be applied to any of the tire measurements discussed herein, including but not limited to run out measurements, force variation measurements and the like.

A first exemplary feature that optionally may be practiced in accordance with measuring tire parameters involves averaging multiple sets of data defined relative to the entire radial periphery of a tire (e.g., 0-360 degrees, or 1-2048 data points, etc.). For example, in some embodiments, measurements are obtained at a number of discrete points around the radial periphery of a tire (e.g., 1024 or 2048 data points at different angular positions around a tire periphery). The waveform representing such data points as measured around the tire may actually correspond to data obtained during multiple revolutions of the tire (e.g., 30, 60, 100 or other total number of revolutions) that are synchronously averaged such that the result will be one record of the total number of data points around the tire periphery.

In some embodiments, the waveform representing a measured quantity around the tire periphery may be obtained by averaging multiple measurements obtained at different tracks (i.e., routes around the tire at which measurements are obtained by laser scanning or the like.) Different tracks typically vary based on their lateral location along a tire crown. By including measurements at one or more tracks along the surface of a tire (e.g., two to five different tracks), more accurate overall tire predictions may be possible. For example, consider the cross section of exemplary tire 500 shown in FIG. 5. The crown 502 of tire 500 is the tread portion of the tire that extends between tire sidewalls 504. Measurements around the radial periphery of tire 500 may be obtained at one or more tracks located at different lateral positions along the tire crown 502. For example, when a tire tread is formed with multiple discrete ribs along the tire crown, measurements may be obtained at one or more different selected ribs. In one embodiment, a measured quantity is obtained at a single track located around the center rib C such as shown relative to tire 500 in FIG. 5. In another embodiment, a measured quantity is obtained at multiple tracks (e.g., A and B, or A, C and B or D, A, C, B and O) and then averaged together or combined as a weighted average of tracks by associating the same of different weighting coefficients to the different tracks.

In still further embodiments, it should be appreciated that the accuracy and effectiveness of tire measurements in accordance with the disclosed technology also may be enhanced by optionally filtering the measurements obtained along the surface of a tire at respective angular positions relative to the tire in order to reduce potential data spikes. Different exemplary types of data filtering that may be useful to improve data quality in accordance with the disclosed techniques include erosion filtering to reduce or eliminate potential positive data spikes and/or convex hull filtering to eliminate or reduce potential negative data spikes.

In one example, an erosion filter may be applied to reduce or eliminate positive spikes in tire measurement data such as may be caused by tread flashing, and/or measurement overshoot by lasers or other sensor components and the like. An erosion filter may operate generally by identifying and eliminating or modifying selected run out measurements that spike above adjacent measurement values. In specific examples, identified data points above a certain value or that are identified to spike above adjacent measurement values can simply be deleted or replaced by a minimum or average value of selected adjacent data points. In another example, a window-based method may be applied in which all data points are filtered by replacing each point with the minimum of all the points in a specified window (e.g., a window of three or more adjacent data points.) Multiple iterations of an erosion filter (e.g., one, two, three or more passes of the measured data through an erosion filter) also could be implemented.

In another example, a convex hull filter may be applied whereby a measured data set is transformed into rectangular coordinates (or other two-dimensional data set) to identify selected data points that lie on a convex hull surrounding the entire set of values. After a subset of data points is located using convex hull algorithms, the remaining data points can be interpolated to obtain a final data set of filtered measurements.

EXAMPLES

To better appreciate the processes illustrated above, numerical examples of tire parameter prediction are presented. The results below provide actual data (i.e., test results for actual tires), and exemplify the types of accuracy that may be possible in determining such high speed tire parameters as uneven mass distribution and radial force variation by predicting such parameters from other measurements, such as radial run out and other measurements.

A first example presents aspects of an actual practiced method of predicting uneven mass distribution. Prediction quality for the uneven mass distribution determination method exemplified in FIGS. 6 and 7 was analyzed based on calibration and determination for three batches of tires. Results were obtained and compared for both the first harmonic (H1) and second harmonic (H2) components of measured high speed radial run out and corresponding uneven mass distribution (UMD). Table 1 shows the average results for the determination of mass (which is directly proportional to the UMD values) for both H1 and H2 normalized to a thirty gram target mass, and includes the average prediction probability (means, standard deviations and root mean square error, etc.) for each harmonic component. As seen from these results, about 84% of mass predictions are within 20% of the target mass, and about 94% of mass predictions are within 20% of the target mass.

TABLE 1

Quality Results for Mass Prediction

| Harmonic | Target (g) | Predicted (g) | RMSE (g) | % within ±20% of Target | COV % |
|---|---|---|---|---|---|
| H1 | 30.0 | 30.72 | 4.21 | 84% | 13.7% |
| H2 | 30.0 | 30.91 | 3.06 | 94% | 9.89% |

A second example presents aspects of an actual practiced method of predicting high speed radial force variation. Quality results for the prediction of HSRFV from ΔRRO and LSRFV measurements were tested by analyzing H1 and H2 components of HSRFV under three different models (Model 1, Model 2 and Model 3). Model 1 predicts high speed radial force variation (HSRFV) values using only ΔRRO data as follows: $HSRFV_h = k*\Delta RRO_h$, for a determined constant k. Model 2 predicts HSRFV using Equation (8) above, and Model 3 predicts HSRFV using Equation (7) above. Three different batches (A, B and C) of twenty test tires were used to determine the calibration coefficients in the above Models 1, 2 and 3. Actual $HSRFV_1$ (first harmonic) and $HSRFV_2$ (second harmonic) measurements were then compared to predicted values using corresponding sets of thirty production tires per batch. Measurements were obtained along a single track at low speeds of 8 kilometers per hour (kph) and high speeds of 120 kilometers per hour (kph). The prediction quality results including the Root Mean Squared Error (RMSE) measured in decanewtons (daN) and coefficient of determination ($R^2$) were obtained, as set forth in Table 9 below.

TABLE 2

Quality Results for High Speed Radial Force Variation Prediction of Tire Batches A, B and C for Selected Models 1, 2 and 3

| Batch Letter | Model # | Harmonic | Equation | Test Tires RMSE (in daN) | $R^2$ | Production Tires RMSE (in daN) | $R^2$ |
|---|---|---|---|---|---|---|---|
| A | 1 | 1 | HSRFV = 15.88 * ΔRRO | 2.15 | 0.46 | 1.80 | 0.64 |
| B | 1 | 1 | HSRFV = 21.58 * ΔRRO | 2.97 | 0.53 | 2.51 | 0.63 |
| C | 1 | 1 | HSRFV = 12.48 * ΔRRO | 3.68 | 0.13 | 2.01 | 0.23 |
| A | 2 | 1 | HSRFV = LSRFV + 13.53 * (ΔRRO) | 0.89 | 0.96 | 1.04 | 0.93 |
| B | 2 | 1 | HSRFV = LSRFV + 21.76 * (ΔRRO) | 1.09 | 0.92 | 0.86 | 0.96 |
| C | 2 | 1 | HSRFV = LSRFV + 25.56 * (ΔRRO) | 0.89 | 0.94 | 0.55 | 0.93 |
| A | 2 | 2 | HSRFV = LSRFV + 22.55 * (ΔRRO) | 1.38 | 0.87 | 1.87 | 0.72 |
| B | 2 | 2 | HSRFV = LSRFV + 19.20 * (ΔRRO) | 2.69 | 0.77 | 1.74 | 0.72 |
| C | 2 | 2 | HSRFV = LSRFV + 31.22 * (ΔRRO) | 1.03 | 0.83 | 0.81 | 0.64 |
| A | 3 | 2 | HSRFV = (1 + 2.56e-05 * $v^2$) * (LSRFV + 13.66 * (ΔRRO)) | 1.09 | 0.91 | 1.59 | 0.74 |
| B | 3 | 2 | HSRFV = (1 + 4.43e-05 * $v^2$) * (LSRFV + 6.30 * (ΔRRO)) | 1.11 | 0.93 | 1.12 | 0.86 |
| C | 3 | 2 | HSRFV = (1 + 3.17e-05 * $v^2$) * (LSRFV + 10.20 * (ΔRRO)) | 0.60 | 0.91 | 0.60 | 0.80 |

As can be observed from Table 2, Model 2 provides good results for first harmonic (H1) prediction, yielding $R^2$ values for the production tires in a range of about 0.93-0.96, which is quite close to a perfect prediction fit represented by an $R^2$ value of 1.0. Model 2 also provides good results for second harmonic (H2), yielding $R^2$ values for the production tires in a range of about 0.62-0.72. However, even better results are obtained for H2 using Model 3, where $R^2$ values for the production tires fell within a range of about 0.74-0.86. As such, for higher harmonics (H2 and above), Model 3 better captures the physical behavior of a tire than Model 2 or other models considered in the example.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of electronically determining uneven mass distribution levels for a production tire based on measured radial run out values, said method comprising:
   electronically establishing a calibration curve for one or more test tires that correlates at least one harmonic of interest for measured radial run out to electronically calculated centripetal force;
   measuring on a tire measurement apparatus the radial run out for the production tire having unknown uneven mass distribution, and isolating at least one harmonic of interest from the measured radial run out;
   electronically mapping the at least one harmonic of interest of the measured radial run out for the production tire to centripetal force using the calibration curve; and
   electronically calculating the uneven mass distribution for the production tire from the centripetal force identified from said electronically mapping step; and
   grinding or adding extra mass to the production tire to reduce levels of uneven mass distribution identified in the production tire.

2. The method of claim 1, wherein the radial run out measured for one or both of the one or more test tires and the production tire is obtained by averaging multiple radial run out measurements obtained at different lateral track locations along a tire crown.

3. The method of claim 1, wherein the measured radial run out values for one or both of the one or more test tires and the production tire is obtained by subtracting a series of tire surface measurements obtained at high speed from a corresponding series of tire surface measurements obtained at low speed.

4. The method of claim 1, wherein electronically calculating the uneven mass distribution for the production tire comprises dividing the identified centripetal force by the square of the rotational speed of the tire at which the radial run out was measured.

5. The method of claim 1, further comprising electronically identifying a quality characteristic associated with the production tire based on the level of electronically calculated uneven mass distribution.

6. The method of claim 1, wherein electronically establishing a calibration curve for one or more test tires more particularly comprises:

measuring on a tire measurement apparatus initial high speed radial run out ($HSRRO_{h-0}$) and low speed radial run out ($LSRRO_{h-0}$) for a harmonic of interest h for one or more test tires;

iteratively adding patches having different levels of known mass for (j=1, 2, ..., J) different levels of patch mass variation to each of the one or more test tires and again measuring on a tire measurement apparatus high speed radial run out ($LSRRO_{h-j}$) and low speed radial run out ($LSRRO_{h-j}$) for the harmonic of interest h for the one or more test tires;

calculating centripetal force ($CF_h$) for each patch mass variation (j=1, 2, ..., J) added to the one or more test tires from the radial run out measurements, the rotational speed at which such measurements are obtained, and the known patch parameters; and plotting the calculated centripetal force values ($CF_h$) versus the radial run out value ($\Delta RRO_h$) defined as:

$$\Delta RRO_h = \Delta RRO_{h-j} - \Delta RRO_{h-0} = (HSRRO_{h-j} - LSRRO_{h-j}) - (HSRRO_{h-0} - LSRRO_{h-0})$$

for each different combination of patch mass variation and tire rotational speed.

7. The method of claim 6, wherein calculating centripetal force ($CF_h$) for each patch mass variation employs the following formula:

$$CF_h = \frac{\omega^2 m R_\theta}{h} \frac{\sin\frac{Lh}{2R_\theta}}{\frac{L}{2R_\theta}},$$

where w is the rotational speed of the tire at high speed, m is the mass of the patch, h is the harmonic component number of interest, L is the length of the patch and $R_0$ is the nominal tire radius.

8. The method of claim 6, wherein electronically calculating a calibration curve for one or more test tires further comprises performing an interpolation among the plurality of data points ($CF_h$, $\Delta RRO_h$) plotted for each different combination of patch mass variation and tire rotational speed.

9. The method of claim 1, wherein the radial run out measured for one or both of the one or more test tires and the production tire more particularly comprises:

obtaining a plurality of radial run out measurements measured along the surface of a tire at respective angular positions relative to the tire; and filtering the radial run out measurements to reduce potential data spikes.

10. A method of electronically determining high speed radial force variation for a production tire based on measured radial run out values and a speed-dependent calibration model, said method comprising:

measuring radial run out for a plurality of test tires at low speed and at high speed;

measuring radial force variation for the plurality of test tires at low speed and at high speed;

using the radial run out and radial force variation measurements to electronically calculate coefficients for generating a speed-dependent calibration model relating low speed radial force variation and radial run out to high speed radial force variation as a function of at least a rotational frequency of the production tire at high speed such that the rotational frequency is a variable in the speed-dependent calibration model;

measuring radial run out for a production tire at low speed and at high speed;

measuring radial force variation for the production tire at low speed; and electronically calculating high speed radial force variation by applying the radial run out and radial force variation measurements for the production tire to the speed-dependent calibration model; and grinding or adding extra mass to the production tire to reduce levels of high speed radial force variation identified in the production tire.

11. The method of claim 10, wherein the coefficients calculated for generating a speed-dependent calibration model comprise a speed coefficient and a tire stiffness coefficient.

12. The method of claim 10, wherein said speed-dependent calibration model relates a harmonic component of interest h of high speed radial force variation ($HSRFV_h$) at a given speed (v) to a harmonic component of interest h of low speed radial force variation ($LSRFV_h$), a harmonic component of interest h of high speed radial run out ($HSRRO_h$) and a harmonic component h of low speed radial run out ($LSRRO_h$) by the following equation:

$$HSRFV_h = [1+\beta v^2]*[LSRFV_h + \alpha_h*(HSRRO_h - LSRRO_h)],$$

where $\beta$ is the speed coefficient and $\alpha_h$ is the stiffness coefficient for the h harmonic.

13. The method of claim 10, wherein selected radial run out values measured for one or both of the plurality of test tires and the production tire are obtained by averaging multiple radial run out measurements obtained at different lateral track locations along a tire crown.

14. The method of claim 10, further comprising electronically identifying a quality characteristic associated with the production tire based on the level of electronically calculated high speed radial force variation.

15. The method of claim 10, wherein selected radial run out values measured for one or both of the plurality of test tires and the production tire are more particularly measured by:

obtaining a plurality of run out measurements measured along the surface of a tire at respective angular positions relative to the tire; and filtering the run out measurements to reduce potential data spikes.

16. The method of claim 10, wherein said high speed radial force variation is electronically calculated for one or more harmonics of interest of high speed radial force variation.

17. The method of claim 10, wherein said method is used for predicting harmonic components of high speed radial force variation higher than the first harmonic, and wherein a simplified non-speed-dependent calibration model is used to predict the first harmonic component of high speed radial force variation.

* * * * *